United States Patent [19]

Pomerantz

[11] Patent Number: 4,770,332

[45] Date of Patent: Sep. 13, 1988

[54] COILED LINE TANGLE INHIBITOR

[76] Inventor: Marc H. Pomerantz, 2200 NE. 211th St., North Miami Beach, Fla. 33179

[21] Appl. No.: 486,183

[22] Filed: Apr. 18, 1983

[51] Int. Cl.[4] .......... A61C 3/04

[52] U.S. Cl. .......... 226/200; 433/77

[58] Field of Search .......... 226/196, 200; 174/69; 198/953; 191/12 R, 12 S; 339/2 R, 1 R, 28; 433/78, 79, 77; 439/162, 445, 447; 267/37.1, 37.2, 37.3, 37.4

[56] References Cited

U.S. PATENT DOCUMENTS

| | | | |
|---|---|---|---|
| 888,376 | 5/1908 | Wilson | 174/69 X |
| 1,734,605 | 11/1929 | Smith | 174/69 |
| 2,607,863 | 8/1952 | MacFarland | 174/69 X |
| 2,721,929 | 10/1955 | Schwartz et al. | 174/69 X |
| 2,795,641 | 6/1957 | Rowell | 174/69 |
| 3,216,424 | 11/1965 | Chardack | 174/69 X |
| 3,227,802 | 1/1966 | Pressley, Jr. | 174/69 X |
| 3,248,515 | 4/1966 | Gorman et al. | 226/196 X |
| 3,734,369 | 5/1973 | Johnson | 226/200 X |

*Primary Examiner*—Harvey C. Hornsby
*Assistant Examiner*—Scott J. Haugland
*Attorney, Agent, or Firm*—Gerald R. Hibnick

[57] ABSTRACT

A coiled line tangle inhibitor which comprises a flexible sheath that encases a relatively loosely coiled line to prevent it from tangling with itself as well as tangling with adjacent lines, which also would be sheathed by this invention. The sheath, although very flexible to allow free movement of the coiled line and any attached tool, has sufficient stiffness and diameter so that the coiled line can slide through an open end of the sheath with ease, but without self-meshing, as the line is extended and retracts in normal use.

20 Claims, 1 Drawing Sheet

COILED LINE TANGLE INHIBITOR

BACKGROUND OF THE INVENTION

This invention concerns the problem of tangled coiled lines and means for reducing such problem. When flexible lines or tubes are proximate to each other and are subject to use which causes them to lie on, over, or cross over each other, there is the tendancy for tangling and twisting to occur. If one or more of these flexible lines or tubes itself is of the coiled type, the tangling occurs more frequently, since the coils easily become enmeshed. Moreover, such a coiled line also can and does become caught up within its own coils and this type of tangle can be most troublesome. Coiled lines, wires and tubes are commonplace. Most telephones use a flexible, coiled line between the hand-held portion and the base. In use, such coiled line usually becomes over-twisted and the coils along the line length slip and mesh into each other, not only shortening the effective length of the line, but also making its general use cumbersome.

Another environment for flexible, coiled lines is a dental console, in which is housed the source of compressed air and water. The dental tools are connected to the console via these coiled lines or tubes. As well known, such tubes fit into a supporting rack or tray and lie close to each other, for convenience to the dentist. Equally well known is the fact that the coils of these tubes "hook", tangle or mesh into each other, from different tubes as well as coils from the same tube. Not only are such tangles a general problem to dentists, but they present a dangerous condition, in that a tangle could suddenly apply a pulling force or resistance to the smooth movement of the dental tool in the hand of the dentist, the tool then being near or in the patient's mouth.

Using dentistry as a convenient environment for the coil tangle problem and its solution, it should be noted that there have been prior art solutions. For example, U.S. Pat. Nos. 3,262,735; 3,718,972; and 3,972,120 each appreciate the problem and teach a generally similar solution—separate the tubes by divider walls or baffles. Such separators have merit, but also create their own problems. To provide adequate separation of the tubing, the dividers greatly increase the size of the dental console, as well as its cost. Appearance, and placement of the console also suffer. Present practice is to place the dental tool tray or fixture on a small, swinging platform, depending from which are the coiled tubes. The cited prior art would not be adapted to such present practice.

U.S. Pat. No. 3,972,120 also notes problems associated with another solution to tangled fluid lines in dental consoles. Such solution uses retractable, or roll-up systems, which hold each line (not coiled) and then feed each line under pull from the dentist. These retraction mechanisms use springs, rollers, detents, etc. which are subject to mechanical adjustment and failure. Also they suffer from problems similar to the prior art separators: cost, space, ease of use.

SUMMARY OF THE INVENTION

This invention has as its object to solve the problem of tangled coiled lines, wires and tubing, while at the same time avoiding and/or overcoming the limitations in prior art solutions to this problem. Structure of this invention keeps separated the adjacent flexible coiled lines and also reduces the tendency of a coiled line to entangle upon itself. My invention does not inhibit the free movement of the line and any work piece or tool connected thereto. Not only is my tangle inhibitor light weight, flexible, inexpensive and easily used, it is easy to install over existing flexible coiled lines, without disconnection. Hence it also is easy to replace, if need be.

My invention comprises a flexible sheath or sleeve which encases a coiled line to prevent it from tangling with itself as well as tangling with other adjacent lines, which also would be sheathed by my invention. The sheath, although very flexible to allow free movement of the line and any attached tool, or the like, has sufficient stiffness and diameter so that the line can slide therethrough with ease, but without self-meshing as the line is "expanded" or lengthened in normal use. Preferably, the end of the sleeve closest to the supply source and connected to the dental console is secured to the coiled line at that end thereof.

DETAILED DESCRIPTION OF THE PREFERRED EMBODIMENT

Figure 2:
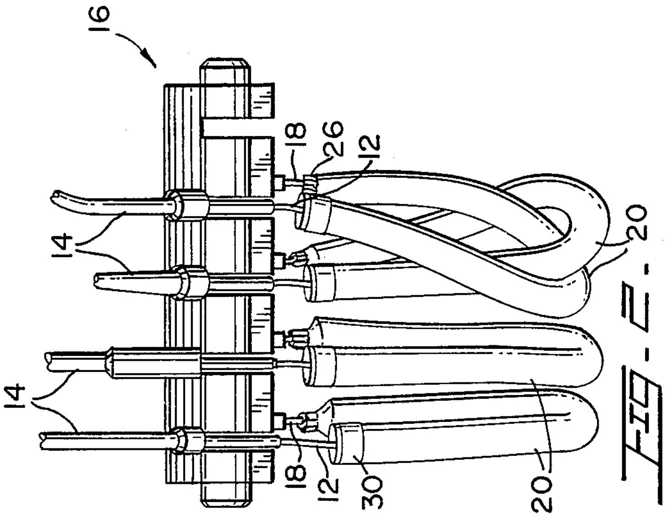
FIG. 2 is a view similar to FIG. 1, but using the sheath of this invention to keep the coiled lines separated.
Figure 1:
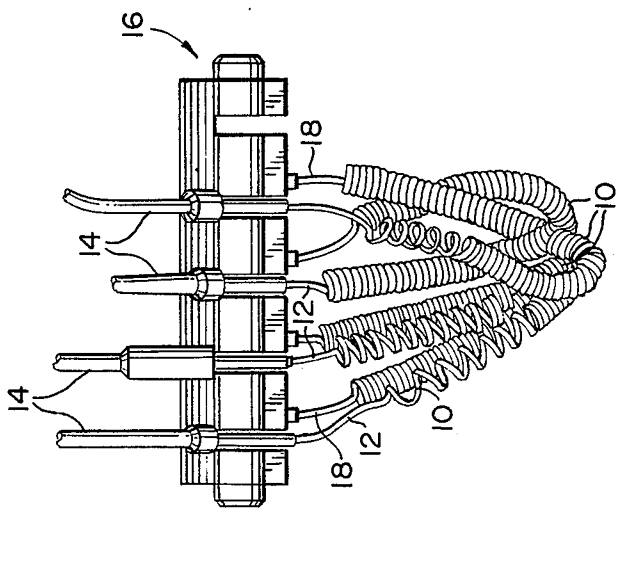
FIG. 1 is a view of the portion of the dental console holding coiled lines which are tangled.

Although FIGS. 1 and 2 illustrate coiled lines as used in a dental office, such use is only one example of practical uses for my invention and is not to be considered limiting. Likewise not limiting are terms "line", "wire", "tube", "conduit", etc. The coiled lines 10 can be of various material, coated and uncoated or covered; generally solid, as an electric wire, or hollow, as a fluid carry line. The lines 10 are coiled so that in use they can be extended or stretched out one or more times their coiled length; hence, they are flexible in that sense. As shown in FIGS. 1 and 2, there are four such lines 10, each having at its free end 12 a dental tool 14 of different and sometimes changeable type. The tool, with the attached free end of the line, is removably mounted to a support member 16, which can be part of the dental tray portion of the console. There are many different types of support members and that which is illustrated is only one useful example. The other end of each line can be termed "fixed", in that it is coupled directly or indirectly to a "source" of air, water, power, etc. Such fixed end 18 is shown coupled to a rear portion of the support member 16 and, via means not illustrated, to the associated "source".

It will be appreciated that, at any one time, more than one of the tools 14 and its associated line 10 can be in use. Hence, when those tools are returned to the support member 16, the lines 10 can become crossed, as shown in FIGS. 1 and 2. The thus crossed lines will have a natural tendancy for their coils to become enmeshed, as shown in FIG. 1. Although the tools and/or the free ends of the lines could be formed to mate discretely with only one holding area of the support member and thus reduce the crossing of the lines, because of erroneous return positioning into the support member, the line crossing still occurs.

Even if the lines would not become crossed, their movement from and to the support member 16 and their close proximity to each other will cause them to become tangled, also as shown in FIG. 1. The normal use of the tools 14 will cause the lines 10 to become twisted. Such twisting not only will enhance the tendency for adjacent lines to tangle, but will cause different coils of the same line to enmesh. Additionally, such twisting will cause a line to be less flexible and more difficult to extend.

FIG. 2 shows the lines 10 of FIG. 1 that have been subjected to the same crossing, proximate movement to and from the support member 16 and twisting. However, by virture of each line being encased in a sheath 20 of this invention, there is no tangle nor enmeshing of lines, nor even of the coils of the same line. Moreover, line twist has been minimized.

Figure 3:
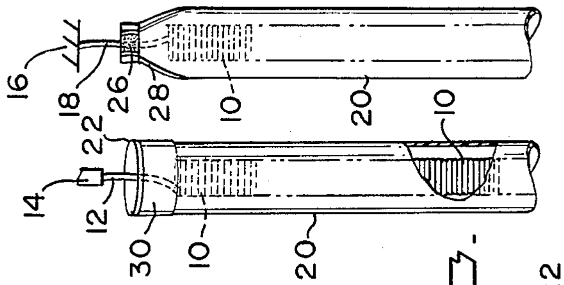
FIG. 3 is a side view of a single sheathed line.

For sake of illustration and explanation of the invention, the sheaths 20 are of transparent material. Such transparency is not an essential feature, but in some environments can be helpful; for example, to enable ease of monitoring the condition of the sheathed line for ware, leaks, etc. The length of the sheath 20 should be sufficient so that the line 10, in its coiled, unextended or normal condition is fully or substantially encased along its entire length, as shown in FIGS. 2 and 3. Of course, some uses of the invention might cause a deviation from the desired full-length sheath.

Figure 4:
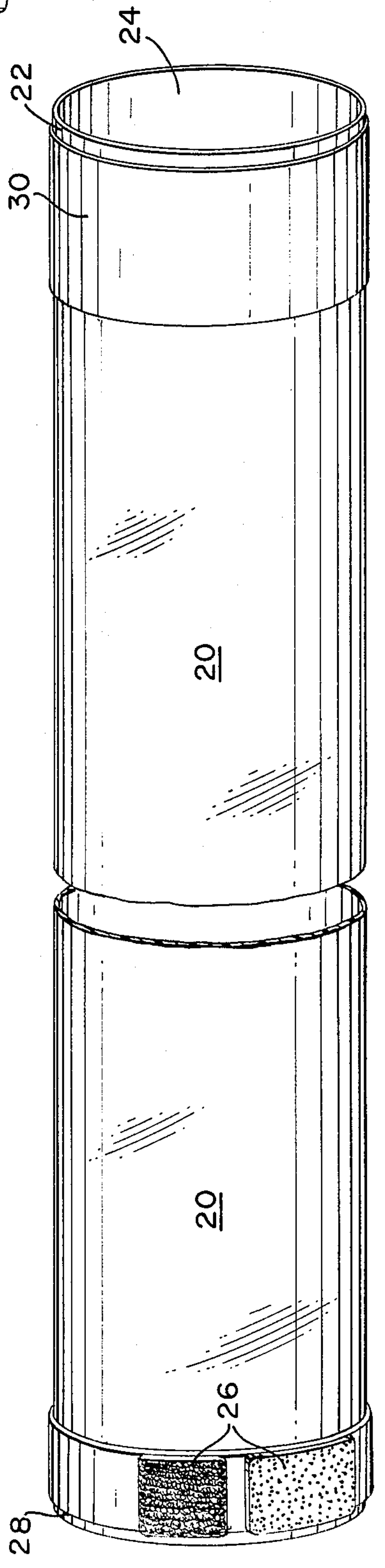
FIG. 4 is a view of the sheath member.

Although the sheath 20 need not be secured to the line at either end, experimental experience has indicated that if one end 28 of the sheath, preferably at the fixed end 18 of the line, is secured to the line 10 or the adjacent support member 16, then the sheath will remain positioned for best use. Means for securing that one end 28 are not limiting. In fact, "secure" is possibly too limiting. All that is desired is that the one end 28 of the sheath not to slide down too far from that end 18 of the line. One way to accomplish this goal is to construct or subsequently constrict the one end 28 to have an opening with a diameter smaller than that of the coiled tube, as shown in FIG. 3. A draw string at the end 28 would suffice. FIG. 4 shows a belt 26 having Velcro ® mating sections which can be overlapped to constrict the end 28 to form a small necked opening.

From the preceeding description, it will be appreciated that the sheath 20 is of a flexible material. The exact type of material would be dictated by the type of line 10 and the environment in which it is used. Thin synthetic, very light weight goods, such as nylon, have proven to be a good choice of material for the sheath used in a dental console. One such thin material is transparent, autoclave tubing made of nylon and sold by Lorvic Corporation of St. Louis, Mo. under the trade name NYCLAVE tubing. This tubing has a thickness of 0.00125 inches and a diameter of three inches; other diameters are available. Thin plastic, cellophane, stiffened cloth, or even treated paper could be a material choice. Whatever material is chosen, the sheath is to be constructed so that the coiled line 10 can slide easily therein as the coils are elongated and then permitted to collapse. This means that the sheath have some stiffness, either inherent in the sheath material, or by virtue of stiffening treatment or construction. To implement free movement of the coils at and through the other end 22 of the sheath, it preferably can be reinforced by a flexible stiffener 30, as shown in FIG. 4 to hold that end open and somewhat rounded, as at 24. FIG. 4 is shown at close to two-thirds scale for a sheath 20 useful for the fluid lines in a dental console. To promote the ease of coil movement, but also meet other mechanical as well as in-use criteria, I have found that a ratio of approximately 2:1 of the diameter of the sheath 20 to the diameter of the coiled line 10 works well. By use of a light weight material, the sheath does not add pressure, pull or generate torque relative to the dental tool.

From foregoing, it will be appreciated that, by sheathing a coiled, flexible line with a flexible sheath having the diameter, light weight, length and flexibility to enable the full range of movement of the coiled line, but inhibiting the coils from intermeshing and twisting and especially for preventing adjacent lines from becoming tangled, there has been achieved a significant advance over the prior art by a simple, inexpensive and easily used device. The exact construction and material of the sheath 20 depends in part upon the coiled line and in part up the environment of use. The variability of construction should now be recognized by those skilled in the art, without departing from the spirit and scope of the invention as disclosed and claimed herein.

What I seek to protect by Letters Patent of the United States is:

I claim:

1. A coiled line tangle inhibitor for encompassing a relatively loosely coiled flexible line, which is capable of self-entanglement comprising: a sheath member of flexible material for encasing at least a substantial length of the coiled line and the coils thereof, said sheath member having a pair of opposite ends, one of said ends normally being open for the passage therethrough of a free end portion of the coiled line when same is extended and then permitted to retract, said sheath member having a diameter and stiffness which are coactive to enable the coiled line to move relatively freely therein as well as said free end portion out from and return thereinto, but yet inhibit the tendency of the coils to mesh upon each other because of twisting or the like of the line.

2. A coiled line tangle inhibitor according to claim 1 in which the sheath member is provided with stiffening means to enhance the ease of movement of at least said free end portion of the coiled line relative to the sheath member.

3. A coiled line tangle inhibitor according to claim 2 in which said stiffening means is provided at least proximate to said one end, to enhance free movement of said free end portion of the coiled line in and out of said one end.

4. A coiled line tangle inhibitor according to claim 1 in which said flexible material is especially thin and light weight, so as not to inhibit the freedom of movement of the coiled line, such movement including bending of the line, nor add any one of pressure, pull or generate torque to said free end portion.

5. A coiled line tangle inhibitor according to claim 4 in which the material of said sheath is of synthetic goods.

6. A coiled line tangle inhibitor according to claim 5 in which said material is of autoclave nylon.

7. A coiled line tangle inhibitor according to claim 1 in which the diameter of said sheath is approximately twice the diameter of the coils of the line.

8. A coiled line tangle inhibitor according to claim 1 in which the other end of said sheath also is open and is provided with means for constricting the size of its opening to be smaller than the size of the coils of the line, so that said other end is impeded from longitudinal movement relative to the line.

9. A coiled line tangle inhibitor according to claim 1 in which the length of said sheath approximates the normally unextended length of the coiled line.

10. A coiled line tangle inhibitor according to claim 1 in which said sheath material is transparent.

11. A coiled line tangle inhibitor according to claim 1 in which said sheath is provided with means for impeding its other end from longitudinal movement relative to the line.

12. A coiled line tangle inhibitor according to claim 1 in which a plurality of said sheath members encase a like plurality of adjacent lines for inhibiting their tangling.

13. Coiled line tangle inhibitor means for inhibiting a plurality of adjacent lines from having coils thereof enmesh, said inhibitor means comprising flexible sheathing means separately encasing at least one and preferably each of the lines along at least a portion of the length thereof, said sheathing means being constructed and adapted to permit freedom of movement of the lines relative to one another by enabling the longitudinal movement of a line relative to its sheathing means as well as a free end thereof to extend out from and to freely return back into its sheathing means.

14. Coiled line tangle inhibitor means according to claim 13 in which said sheathing means has a stiffness sufficient to inhibit the coils of adjacent lines from becoming enmeshed.

15. Coiled line tangle inhibitor means according to claim 14 in which said sheathing means has additional stiffness proximate to one end thereof to promote ease of longitudinal movement of the free end of the line through that one end.

16. Coiled line tangle inhibitor means according to claim 15 in which the other end of said sheathing means is constructed so that it can be impeded from longitudinal movement relative to the encased line.

17. Coiled line tangle inhibitor means according to claim 13 in which said sheathing means has walls which are spaced sufficiently from the line so as to enable relatively free longitudinal line movement therein.

18. Coiled line tangle inhibitor means according to claim 17 in which said sheathing means has a diameter measurement which approximates twice that of a line coil diameter.

19. Coiled line tangle inhibitor means according to claim 13 in which said sheathing means and the encased line have approximately the same length.

20. Coiled line tangle inhibitor means according to claim 13 in which said sheath means is of very light weight material, such that said sheath does not add any one of pressure, pull or generate torque to said free end of said line.

* * * * *